(12) United States Patent
Do et al.

(10) Patent No.: US 10,527,430 B2
(45) Date of Patent: Jan. 7, 2020

(54) METHOD AND APPARATUS FOR BEACON DATA COLLECTION

(71) Applicant: QUALCOMM Incorporated, San Diego, CA (US)

(72) Inventors: Ju-Yong Do, Cupertino, CA (US); Sai Pradeep Venkatraman, Santa Clara, CA (US); Weihua Gao, San Jose, CA (US); Meghna Agrawal, Sunnyvale, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/275,128

(22) Filed: Sep. 23, 2016

(65) Prior Publication Data
US 2018/0087909 A1    Mar. 29, 2018

(51) Int. Cl.
*G01C 21/20* (2006.01)
*G01S 5/02* (2010.01)

(52) U.S. Cl.
CPC .......... *G01C 21/206* (2013.01); *G01S 5/0226* (2013.01); *G01S 5/0236* (2013.01)

(58) Field of Classification Search
CPC ....... H04W 4/028; H04W 4/008; H04W 4/02; H04W 64/00
USPC ......... 455/41.1-2, 42.1, 404.2, 412.1-414.2, 455/418-422.1, 456.1-457; 370/328-332, 370/338
See application file for complete search history.

(56) References Cited

U.S. PATENT DOCUMENTS

| | | | |
|---|---|---|---|
| 8,942,725 B2 | 1/2015 | Marti et al. | |
| 9,167,386 B2 | 10/2015 | Valaee et al. | |
| 2009/0192709 A1 | 7/2009 | Yonker et al. | |
| 2010/0273504 A1* | 10/2010 | Bull | G01S 5/02 455/456.1 |
| 2012/0264454 A1* | 10/2012 | Agardh | G01S 5/0236 455/456.2 |
| 2013/0096993 A1* | 4/2013 | Boszormenyi | G07B 15/063 705/13 |
| 2013/0162481 A1 | 6/2013 | Parvizi et al. | |
| 2014/0059655 A1* | 2/2014 | Beckley | H04W 4/02 726/4 |
| 2014/0064112 A1 | 3/2014 | Das et al. | |

(Continued)

FOREIGN PATENT DOCUMENTS

WO    2015077489 A1    5/2015

OTHER PUBLICATIONS

International Search Report and Written Opinion—PCT/US2017/052081—ISA/EPO—dated Jan. 3, 2018.

*Primary Examiner* — Congvan Tran
(74) *Attorney, Agent, or Firm* — Kilpatrick Townsend & Stockton (57) ABSTRACT

Method, mobile device, computer program product, and apparatus relating to beacon data collection. A user context at a mobile device may be obtained and a recommended configuration for beacon data collection can be determined according to the recommended configuration. A reliability metric may be determined as part of determining the recommended beacon collection configuration. The beacon data collection may include filter or weight to define when or how to send or collect beacon data and/or positioning data.

20 Claims, 5 Drawing Sheets

(56) References Cited

U.S. PATENT DOCUMENTS

| | | | |
|---|---|---|---|
| 2014/0171108 A1* | 6/2014 | Waters | H04W 4/02 455/456.1 |
| 2014/0266789 A1* | 9/2014 | Matus | H04Q 9/00 340/870.07 |
| 2015/0081474 A1* | 3/2015 | Kostka | G06Q 30/0633 705/26.8 |
| 2015/0088835 A1 | 3/2015 | Davis | |
| 2015/0244790 A1 | 8/2015 | Zavesky et al. | |
| 2015/0326953 A1* | 11/2015 | Todasco | H04Q 9/00 340/870.07 |
| 2015/0334676 A1* | 11/2015 | Hart | H04W 64/00 455/456.1 |
| 2015/0369618 A1* | 12/2015 | Barnard | H05B 37/0272 701/491 |
| 2016/0029170 A1* | 1/2016 | DiAcetis | H04W 4/043 455/456.1 |
| 2016/0044718 A1* | 2/2016 | Do | H04W 76/02 370/329 |
| 2016/0132930 A1* | 5/2016 | Handly | G06Q 30/0261 705/14.58 |
| 2016/0192140 A1* | 6/2016 | Park | H04W 40/244 455/456.3 |
| 2017/0039516 A1* | 2/2017 | Amann | H04W 4/70 |
| 2017/0230378 A1* | 8/2017 | Bliss | H04L 63/105 |
| 2017/0316190 A1* | 11/2017 | Stout | G06F 21/305 |
| 2018/0067187 A1* | 3/2018 | Oh | H04W 64/00 |

\* cited by examiner

METHOD AND APPARATUS FOR BEACON DATA COLLECTION

FIELD

The subject matter disclosed herein relates generally to beacon data collection, and more specifically to optimizing data collection according to context.

BACKGROUND

To collect data related to beacon transmitters (for example, Bluetooth (BT) or WiFi Access Points (APs)) a mobile device may use passive scanning techniques comprising periodic scans to sample beacon data. For example, the process of discovering/mapping beacon positions within an indoor environment can include scanning WiFi APs to retrieve MAC addresses, Received Signal Strength Indication (RSSI), Round Trip Time (RTT), or other beacon measurement data. In addition to scanning WiFi APs or BT transmitters, a mobile device may also estimate its own location (for example, upon getting a Global Network Satellite System (GNSS) fix of the mobile device) and attempt to associate or tag the beacon data with the mobile device location. In response to filling a local buffer with beacon data, the mobile device may send the beacon data and any associated location data to a server for processing and mapping of beacons. However, beacon data sent to the server may include erroneous or irrelevant mobile location or beacon data. Also, the mobile device may continuously send data regardless of whether the server has a specific request for the beacon data. A mobile device may therefore sometimes report too much beacon data and all of the reported data may not be entirely relevant or accurate. Therefore, new and improved beacon data collection techniques are desirable.

SUMMARY OF THE DESCRIPTION

Embodiments disclosed herein adjust and schedule beacon data collection (BDC) according to user or device context to enhance crowdsourcing and to reduce power consumption while avoiding wasteful or misleading data. Depending on user or device context, a particular BDC configuration for crowdsourcing is recommended for a device.

Embodiments disclosed herein may relate to a method for obtaining user context from positioning data of a mobile device; determining, based on the obtained user context, a beacon data collection configuration; and collecting the beacon data according to the beacon data collection configuration.

Embodiments disclosed herein may also relate to a machine readable non-transitory storage medium having stored therein program instructions that are executable by a processor to: obtain user context from positioning data of a mobile device; determine, based on the obtained user context, a beacon data collection configuration; and collect the beacon data according to the beacon data collection configuration.

Embodiments disclosed herein may further relate to a device to: obtain user context from positioning data of a mobile device; determine, based on the obtained user context, a beacon data collection configuration; and collect the beacon data according to the beacon data collection configuration.

Embodiments disclosed herein may further relate to an apparatus with means for obtaining user context from positioning data of a mobile device; means for determining, based on the obtained user context, a beacon data collection configuration; and means for collecting the beacon data according to the beacon data collection configuration.

Other features and advantages will be apparent from the accompanying drawings and from the detailed description.

DESCRIPTION

Aspects of the invention are disclosed in the following description and related drawings directed to specific embodiments of the invention. Alternate embodiments may be devised without departing from the scope of the invention. Additionally, well-known elements of the invention may not be described in detail or may be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

In one embodiment, beacon data collection (BDC) is adjusted and/or scheduled according to current user or device context. The adjustment and/or scheduling results in enhanced crowdsourcing efficiency and accuracy which may also reduce power consumption (for example, avoiding processing and sending of irrelevant or misleading data). Depending on a particular user or device context, a BDC configuration for crowdsourcing is recommended for a mobile device. For example, for indoor beacon discovery, a device may adjust or begin measurement data collection when a mobile device is determined to be in one or more particular contexts (for example, "in pocket" or "in a bag," to name two potentially reliable collection contexts). Alternatively, a mobile device may reduce or end BDC when the mobile device has been subjected to erratic movements that may reduce accuracy of certain mobile device positioning sensors. For example, "arm swinging" and "in a moving vehicle" may be a difficult context to effectively interpret and analyze using only motion sensors. Therefore, each user or mobile device context (for example, "in pocket", "in a bag", "arm swinging", "in a moving vehicle") may be assigned or associated with a different configuration of sensors or different types of BDC techniques. As used herein, a user or device "context" does not refer to a geographic location or position of the mobile device. Rather, as used herein, the user context refers to a motion state of the mobile device (e.g., steadily moving in airplane, resting on table, the mobile device is being held by or is attached to a swinging arm, etc.), a location of the mobile device relative to the user (e.g., held upright in hand of user and being viewed by user, in user's pant pocket, in user's shirt pocket, strapped to user's arm, etc.), or to an activity of the user while holding, wearing, or otherwise possessing the mobile device (e.g., the mobile device is being held or is attached to a swinging arm of a user, the mobile device is being held or is attached to an arm while user is running, the mobile device is being held or is attached to an arm while user is swimming, in user's pocket while user is riding bicycle, etc.), or any combination thereof. The reliability of sensor measurements, beacon measurements, wireless signal measurements, or any combination thereof can be affected by the context of the device.

In one embodiment, the mobile device can report mobile user or device context to a server so the server can reject or adjust processing or configuration of the mobile device's collection of measurement data. A server can evaluate reliability of data collection per context (for example, in some cases a device swinging in a user's hand may be less effective or reliable for motion sensor data collection than if in a pocket) and re-tune future data collection (for example, sending updated data collection configuration/guidance to mobile devices, such as instructions to trigger data collection specifically during "in a pocket" rather than when the context is "in a bag" or other context).

Figure 1:
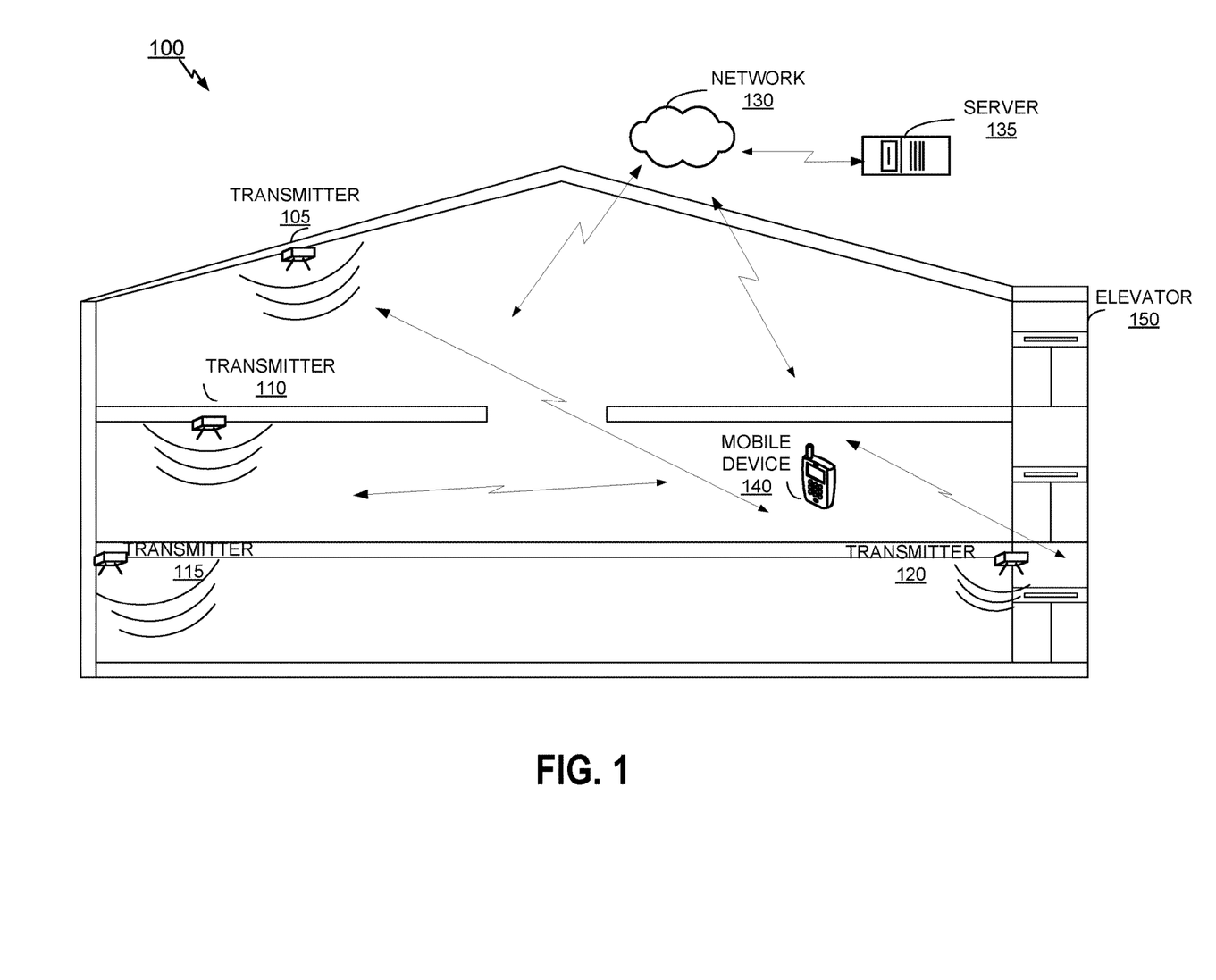
FIG. 1 is block diagram illustrating an exemplary operating environment in which embodiments for beacon data collection (BDC) may be practiced.

FIG. 1 is a diagram of an exemplary operating environment for collecting beacon data. In one embodiment, BDC operates in an environment (for example, location 100) including one or more mobile devices (for example, mobile device 140), one or more beacons or transmitters (for example, beacons 105-120), and one or more servers (for example, server 135). Location 100 may be an indoor location such as a venue, shopping mall, office space, or other location having multiple floors or levels. In some embodiments, location 100 may be a combination of indoor and outdoor locations. For example, a mall may have indoor and outdoor sections, or may be entirely outdoors. Each floor or level within location 100 may have one or more beacons (for example, WiFi AP or BT transmitters) used for providing cellular or other communications, data, features, and/or positioning assistance to mobile devices. As used herein, more generally, a beacon can include any radio device that transmits a radio signal that can be useful for positioning.

A server (for example, server 135) or other device may provide a map from a database or archive to mobile device 140. The map may be implemented as a Computer Assisted Drawing (CAD), Extensible Markup Language (XML), or other file type and may contain one or more of location details regarding physical structure, landmarks (for example, designating pedestrian accessible areas or paths), or beacon locations. The map may be maintained by a venue (for example, location 100) and updated with changes to the beacon layout as the changes are reported. In response to receiving mobile device data, or independently of receiving a mobile device update, Server 135 may provide assistance data to mobile devices in order to aid their positioning through a location. For example, assistance data may include a map of the location (for example, including building or floor layout and points of interest), number of known access points, historical data traffic, or device activity associated with the position or location.

In one embodiment, mobile device 140 performs indoor positioning through analysis of signals from one or more beacons (for example, 105-120). In one embodiment, beacons 105-120 are Wi-Fi access points, Bluetooth devices, femtocells, radio frequency (RF) transmitters, or other wireless systems or transmission protocols and are capable of being used for mobile device positioning within location 100. Beacons 105-120 may be APs that are part of a Wireless Network 130 (for example, Wireless Local Area Network, Wide Area Network, etc.), which may operate in buildings and perform communications over a relatively small geographic region compared to a Cellular or Wide Area Network. Such APs may be part of, for example, Wi-Fi networks (802.11n, 802.11ac, 802.11ax, etc.).

In some environments, devices may have difficulty determining a reference floor or level of particular beacons at a venue or location. For example, in some environments a device may not have access to floor maps or assistance data to determine if a particular beacon ID (for example, media access control (MAC) address) is assigned to a particular floor. In some embodiments, BDC activates a barometer data collection configuration (for example, barometer data used to estimate the floor or level of the mobile device) if multi-level beacon ambiguity is detected or when the mobile device is determined to be on an escalator or elevator (for example, elevator 150).

In some embodiments, mobile device 140 calculates positioning data in as part of performing BDC. Beacon data may be associated or linked to positioning data calculated by the device. The calculated positioning data can include calculated indicia of the reliability or accuracy of the calculated positioning data. When the positioning data is tagged with metadata (for example, reliability or accuracy information) the server receiving the positioning data and metadata can efficiently determine which input data to use for a particular region or location. For example, some data for a region or location may be collected with high position accuracy and the server may choose to discard or replace less accurately positioned beacon data. In other words, although beacon data may be accurately received or monitored, the associated position of the mobile device may be of varying levels of trustworthiness/reliability.

While a mobile device is collecting beacon data, one or more user contexts for the mobile device may be determined. For example, the mobile may be in a user's pocket, in a bag, swinging in hand, in a moving vehicle, or other context while attempting to collect beacon data. Accuracy of the position of the mobile device may depend on multiple factors, including the method used for determining position as well as the user context. Context can influence the accuracy of positioning when using certain methods, such as positioning methods using motion sensors. For example, Pedestrian Dead Reckoning (PDR) accuracy may be affected by erratic or random movement. Therefore, when potentially unreliable positioning data (for example, as determined according to particular context at time of positioning) is collected during PDR, the mobile device may tag/update reliability/accuracy metadata associated with the position and beacon data. Associated beacon data may have one or more metadata fields such that the server can determine how to best process the received BDC. In some embodiments, reliability/accuracy metadata may be determined according to one or both of user and device context.

Figure 2A:
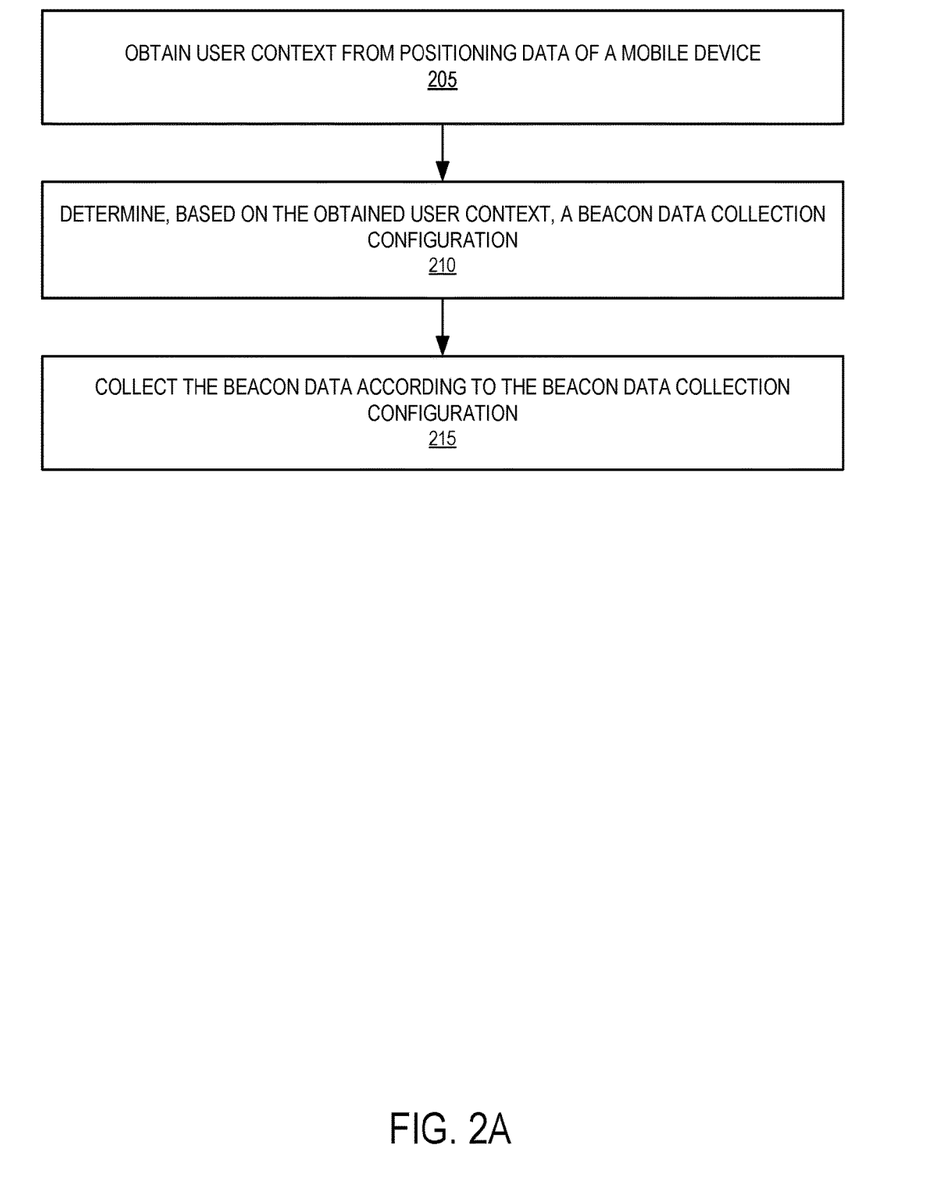
FIG. 2A illustrates a method for performing BDC by a mobile device or a server, in one embodiment.

FIG. 2A illustrates a method for performing BDC by a mobile device or a server, in one embodiment. At block 205, the embodiment (for example, BDC implemented at a mobile device, server, or a combination thereof) obtains user context from positioning data of a mobile device. For example, a mobile device may refer to its generated positioning data, or alternatively a server may receive user context from the positioning data of the mobile device. In some embodiments, obtaining the user context from the positioning data of the mobile device includes obtaining a user context indicative of one of: a user arm swinging the mobile device, the mobile device is in a vehicle, the mobile device is in backpack, or the mobile device is in a user's pocket. User context may be associated, tagged, or otherwise linked to beacon data before processing or sending the beacon data to a server. Therefore, the beacon data to context association at the data source allows the server to reference the relevant user context when the data is received at some point in time after actual data collection. In some embodiments, BDC determines a reliability metric based, at least in part, on the user context, where the BDC configuration is based on the reliability or effectiveness metrics. In some embodiments, the mobile device sends beacon data with the reliability metrics to a server. When the beacon data is received at a server, the server may determine the BDC configuration. The BDC configuration may include parameters for whether the user context meets the particular required reliability for the particular environment. In some embodiments, the server lowers a reliability threshold in areas (i.e., location(s)) where little to no beacon data was collected. In such embodiments, the BDC configuration can be set so that positioning and beacon data are collected even though reliability is low in view of the paucity of useful data for that area. In contrast, the server may determine that areas with high coverage from mobile device crowdsourcing may be subjected to a high reliability threshold for receiving additional BDC. In other embodiments, a default reliability threshold is determined regardless of the prior coverage or data points previously obtained.

In some embodiments, in response to determining one or more potentially problematic user contexts (for example, above a threshold amount of arm swinging) while performing mobile device sensor based positioning, the mobile device will bypass or de-activate BDC. For example, bypass or de-activation of BDC may be enabled by setting a null BDC configuration such that no BDC is triggered or recommended. In other embodiments, the mobile device may collect beacon data regardless of context, however if the context does not indicate reliability of positioning data above a threshold, the data is deleted, ignored, or otherwise not sent to a server.

In some embodiments the reliability metrics (for example, saved as metadata associated with one or both of beacon and positioning data) are further based on one or more of: beacon data, positioning data consistency, or a combination thereof. For example, if beacon data is rapidly changing when it reasonably should be stable, the beacon data itself may be unreliable. Errors in beacon data may be due to object signal blocking, RF interference or other causes. Also, positioning data may be detected as inconsistent. For example, if a user alternates between pedestrian speeds and vehicle speeds the data collected may be tagged as less reliable.

In one embodiment, BDC configuration includes, for example, a weight for each of a plurality of user contexts, types of beacon data, or types of positioning data. For example, with reference to weights for each of a plurality of user contexts, a server may determine that even low-reliability contexts can be useful for crowdsourcing for various purposes. However, it would be inefficient to use mobile device power resources to collect a lot of such data. Hence, a given user context or BDC configuration may be given a weight indicating to a mobile device how much data for the given user context or BDC configuration to collect. For example, user context 1 may be assigned a weight of 10%, user context 2 may be assigned a weight of 35%, and user context 3 may be assigned a weight of 55%. Based on these weights, the mobile device can then collect beacon data so that data collection associated with, for example, user context 1 represents only 10% of all beacon data collected in terms of the amount of data or in terms of a mobile device power used to collect the data, while user context 2 represents 35% of all beacon data collected, etc. Similar weights can be assigned to the types of beacon data, for example, BTLE, AP, etc., data, or to types of positioning data, for example PDR-based data or WiFi-based data, or, alternatively, mobile-computed mobile positions or mobile-computed beacon positions, etc.

In one embodiment, BDC configuration includes/specifies when or whether to collect beacon or positioning data. For example, if beacon data or positioning data collection becomes unreliable, collection may be terminated or suspended for a set period of time. In one embodiment, BDC configuration includes when to send beacon or positioning data. For example, the beacon or positioning data may be sent after a set amount of data is collected or a reliability of the data is reached, or a time since collecting has passed. In one embodiment, BDC configuration includes which of a plurality of mobile device sensors to use. For example, when vertical positioning is uncertain the mobile device may activate its barometer to aid in determining vertical position of the mobile device. In one embodiment, BDC configuration includes a beacon or positioning data collection frequency.

At block 210, the embodiment determines, based on the obtained user context, a BDC configuration. For example, a mobile device may create a BDC configuration in response to determining the user context, or alternatively a server may create a BDC configuration in response to receiving the user context from a mobile device. In one embodiment, determining the BDC can be based on a reliability metric associated with the obtained user context. Hence a context with a low reliability metric can have a different BDC compared to a user context with a higher reliability metric. In one embodiment, the BDC configuration is determined according to both the user context and a reliability metric. As explained elsewhere herein, the reliability metric is based on collected beacon data, for example, crowdsourced historical beacon data, positioning data consistency, or a combination thereof.

At block 215, the embodiment collects the beacon data according to the BDC configuration. In some embodiments a mobile device collects beacon data according to the BDC configuration, and in other embodiments a server collects the beacon data from a mobile device collected according to the BDC configuration. In one embodiment, beacon measurement data includes one or more of: RSSI, RTT, beacon position, or any combination thereof. In some embodiments, the server processes the collected beacon data according to one or both of the user context or a reliability metric.

Figure 2B:
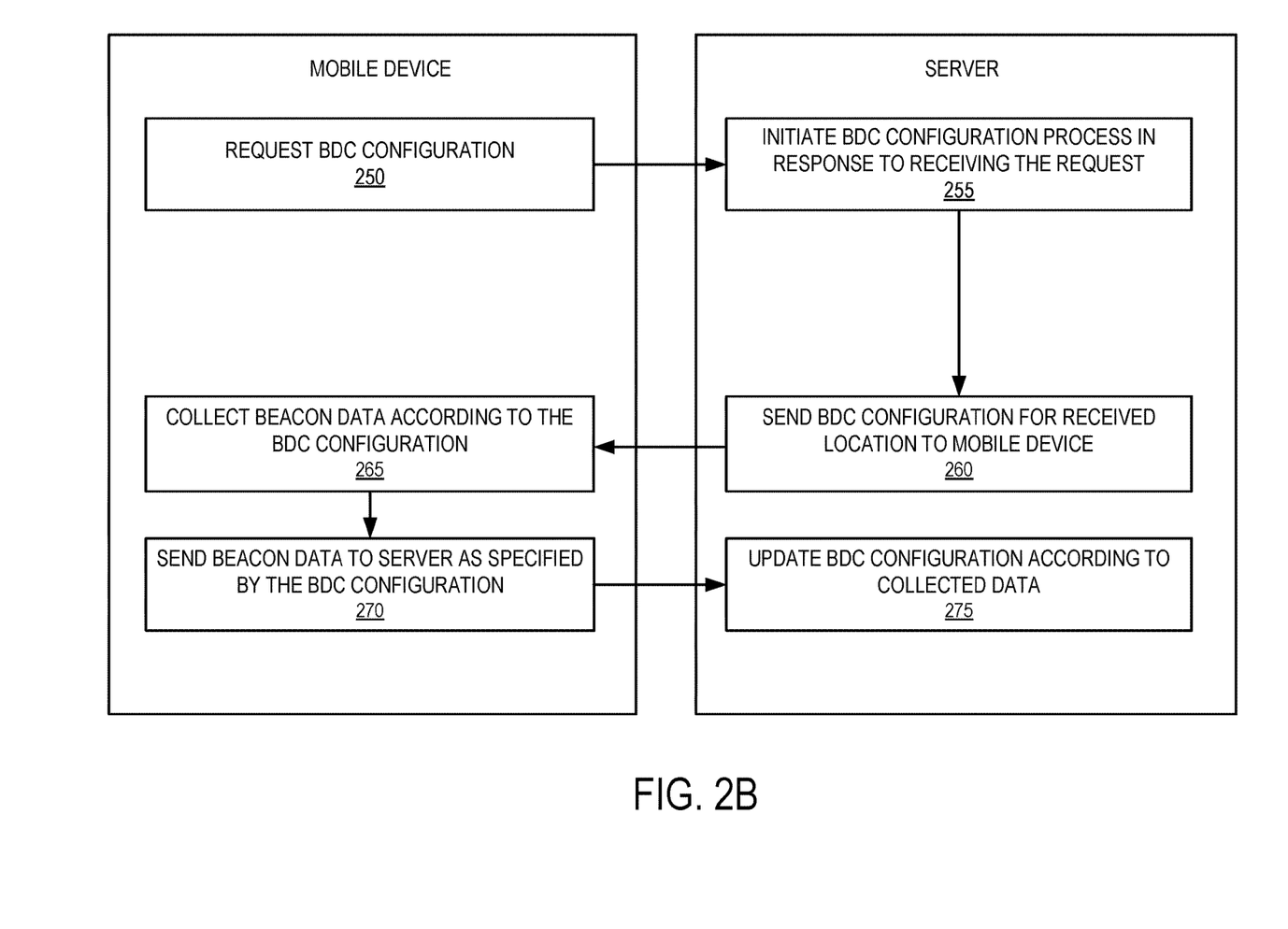
FIG. 2B illustrates a mobile to server process flow for performing BDC, in one embodiment.

FIG. 2B illustrates mobile and server process flow for performing BDC, in one embodiment. At block 250, the mobile device requests BDC configuration. The BDC configuration may be a default or generic BDC configuration if no prior mobile device reporting has been received. In some embodiments, the mobile device requests BDC configuration by sending the mobile device's current position to the server. For example, the mobile device may be configured to send position data that can automatically trigger a process for determining a BDC configuration at the server.

At block 255, the server obtains the BDC configuration in response to receiving the request from the mobile device. In some embodiments, the server creates a BDC configuration locally (i.e., initiated at the server and stored in server memory) in response to receiving the request. In other embodiments, the server may reference a previously created BDC configuration in response to receiving the request. In some embodiments, the mobile device is one of a plurality of mobile devices. The mobile devices sending data to the server may be in the same or different locations and the server may also record when data is being received. The server may also receive beacon measurement data and reliability metrics or metadata. In one embodiment, the BDC configuration is obtained or created according to the received location and the respective context of the user or device at the location. For example, a user in their car on public roads might result in dormant or inactive BDC configuration compared to a BDC configuration to actively gather data when in a pocket context while the user is in a shopping mall.

At block 260, the server sends BDC configuration to the mobile device. As introduced above, the server may send a BDC configuration that is determined according to a mobile device location and the respective user or device context at that location. The server can use BDC configuration to increase data from trustworthy sources or limit data from untrustworthy sources. For example, the BDC configuration may be a crowdsourced implantation sent to a number of mobile devices. The server can use BDC configuration to increase or decrease particular beacon data for one or more beacons in the vicinity of the mobile device(s).

At block 265, the mobile device collects beacon data according to the received BDC configuration. If permissions of the mobile device allow for following the recommended BDC configuration the mobile device can implement the recommended BDC configuration, for example, by enabling sensors in accordance with the demands of the BDC configuration and collecting the beacon data.

At block 270, the mobile device sends beacon data to the server as specified by the BDC configuration.

At block 275, the server updates the BDC configuration according to the collected data. The server may constantly adjust recommended BDC configurations according to received context and beacon data. Further details regarding updating BDC configurations is described below with regards to FIG. 3.

Figure 3:
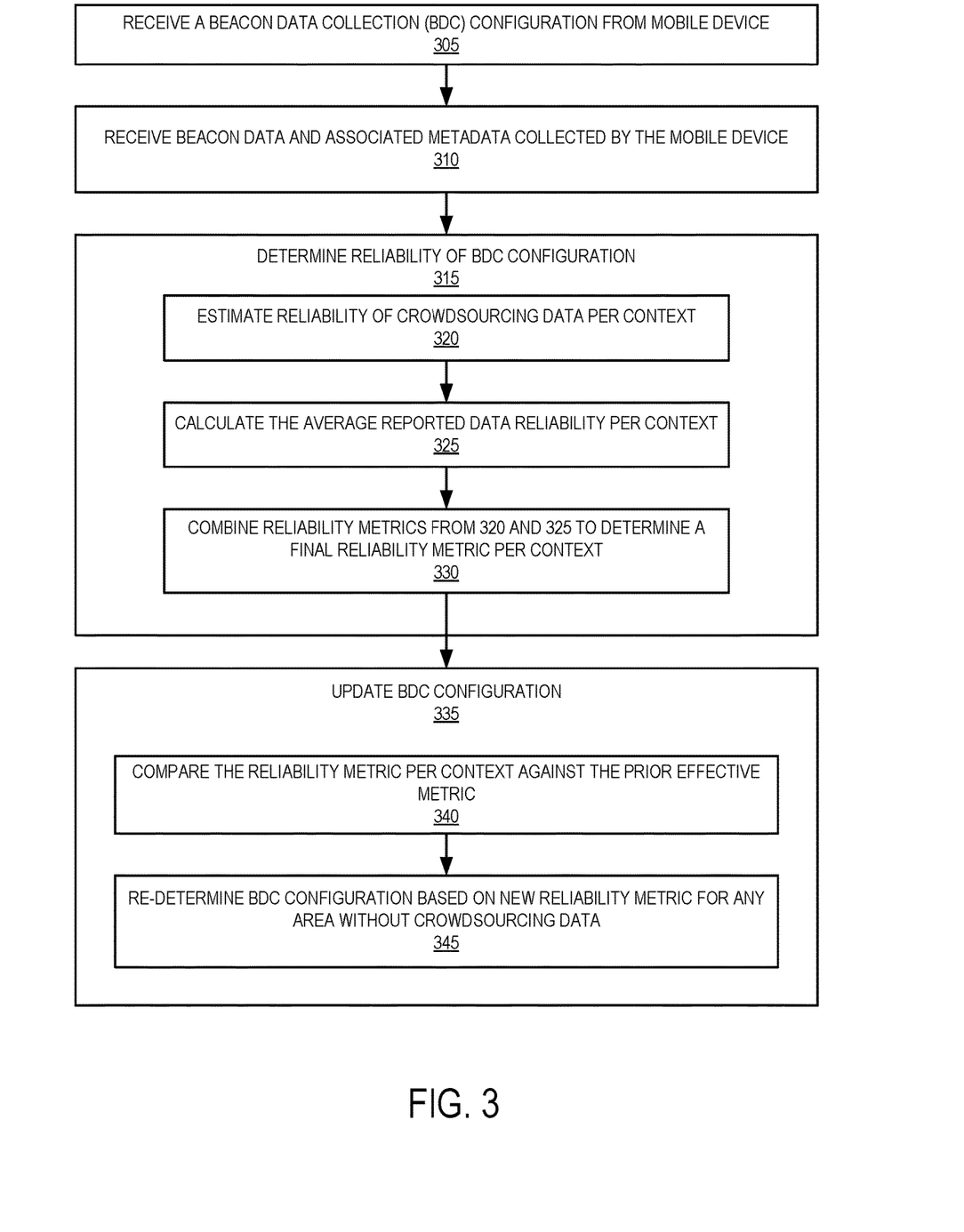
FIG. 3 illustrates a method for a server to implement BDC, in one embodiment.

FIG. 3 illustrates a method for a server to implement BDC, in one embodiment. BDC can use server side optimization of BDC configuration files to limit unnecessary or unreliable mobile device crowdsourcing. BDC can reduce power and storage used by mobile devices and can reduce the total data transfer between mobile devices and the server. At block 305, the server (for example, a server implementing BDC) receives a BDC configuration. The received BDC configuration may be a default BDC configuration generated at the server, or the BDC configuration may be a BDC configuration created or edited at a mobile device or other source. For example, the mobile device performing context determination and beacon data collection may adjust its own BDC configuration in real time (i.e., on the fly) in response to a change in one or both of beacon data parameters and device context. In some embodiments, the mobile device may create or edit a BDC configuration and a server may send the mobile device a recommended BDC configuration. The mobile device may determine whether to use a BDC configuration recommended by a server or a local BDC configuration (for example, according to local or user device preferences for which BDC configuration is preferred).

At block 310, the server receives beacon data and associated metadata collected by the mobile device. For example, the beacon data collected by the mobile device may be sent to the server with associated positioning data, user context, and/or a reliability metric.

At block 315, the server determines reliability of the BDC configuration. As is discussed elsewhere herein, in some embodiments, reliability of the BDC configuration includes one or more of a per context reliability, average reported reliability, and a combined reliability metric.

In some embodiments, as part of determining reliability of the BDC configuration at block 315, the server estimates accuracy of crowdsourcing data per context (block 320), calculates the average reported data reliability per context (block 325), and combines reliability metrics from blocks 320 and 325 to determine a final reliability metric per context (block 330). For example, the server may evaluate usefulness of each context by comparing beacon data from different contexts. For example, the server may determine a first context was initially classified as a best context but may subsequently determine another different context is more useful or appropriate. The server can combine its own evaluation with the mobile device's evaluation and deliver a final reliability metric for each known context. In some embodiments BDC configurations are updated if a certain context's value changes (for example, increases or decreases in determined reliability).

Reliability may be determined at least in part by analyzing the BDC metadata to determine the beacon and positioning data source context. For example, certain context(s) may be inherently less reliable than other context and each context may be configured to carry a particular reliability weight. The server may determine that low reliability, or certain flagged user or device contexts may cause their associated position and beacon data to be ignored or provided with a lower weight during processing. The server may estimate target variables (for example, beacon location, RTT, RSSI, turnaround calibration function (TCF) or other variables) with all crowdsourcing data (for example, without removal of unreliable sources). In response to estimating the target variables with all crowdsourcing data, the server can split the crowdsourcing data per user or mobile device context (for example, data "in pocket," data "in bag," data "arm swinging," and other context) to estimate target variables in a separated dataset. The server can calculate the difference of estimates based on separated datasets against data based on the original dataset (including all crowdsourcing data). In one embodiment, the server determines an inverse of the absolute difference as a reliability metric. The combined dataset may be used as a reference to estimate reliability of individual measurement sets.

In one embodiment, the server or the mobile device, or both, checks the reliability and accuracy of data from certain context(s) by comparing data from different data sets, where each dataset represents data associated with a given context. For example, if the mobile device is estimating a WiFi AP location based on WiFi RSSI measurements, the mobile device may estimate AP's location based on these different datasets. Estimations may be determined by such calculations for contexts 1 through N such as, for example, Estimate_context1=f(dataset from context1); Estimate_context2=f(dataset from context2); and Estimate_contextN=f(dataset from contextN). By comparing these estimates to each other, a reliability and accuracy of a particular context can be estimated. An estimate of a beacon position may also be determined using an average of all of the estimates from the different contexts, or more generally, an estimate of a beacon position may be determined as some function of a dataset including data from all contexts, for example, Estimate_allContexts=f(datasets from all contexts). A beacon location estimate may also be determined based on a dataset including data from a subset of contexts, not all contexts.

In one embodiment, the mobile device compares all contexts to a selected context to determine which contexts are closer to a "reference." If true AP location is unknown, Estimate_allContexts may be used as a most reliable available "reference." The mobile device can check which of the other estimates are closer or farther away from this reference. If a closer estimate is discovered, the closer estimate may be assumed to be more accurate than other farther estimates. If the AP location is already known (for example, server sent assistance data for WiFi positioning and includes the particular AP's location), then, instead of Estimate_allContexts, the mobile device may use the actual/known AP location as a reference by estimating target variables (for example, AP location, WiFi, AP RTT, TCF, etc.) with all crowdsourcing data. In one embodiment, the mobile device splits data per mobile context (for example, data "in pocket," data "in backpack," data "arm swinging," or other type of data) and estimates target variables for each particular separated dataset. The mobile device can calculate the difference of estimates based on separated datasets against that based on the combined dataset before split. In one embodiment, the inverse of abs(difference) is used as a reliability metric. For example, the estimate from combined dataset may be used as a reference and estimate accuracy of individual measurement sets. Hence, the reliability metric can be based on collected beacon data, for example, crowdsourced historical beacon data, positioning data consistency, for example consistency of mobile positioning data or beacon positioning data, or a combination thereof. Although the embodiments discussed above relate to the reliability metric of a given user context, it is understood that a reliability metric can be computed for a given BDC configuration in a similar manner by, for example, comparing beacon positioning data collected under various BDC configurations to each other.

At block 335, the server updates BDC configuration. For example, the server may update the configuration for a specific geographic area, or a specific type of geographic area.

At block 340, the server compares the reliability metric per context against the prior reliability metric.

At block 345, the server re-determines BDC configuration based on new reliability metric for any area without crowdsourcing data. In some embodiments, the server re-determines BDC configuration when the difference between the reliability metric per context compared to the prior reliability metric is greater than a configurable threshold amount. For any area without crowdsourcing data, a default BDC configuration may be used as a starting point. As reliability metrics are measured, the server can specify that contexts having a reliability metric below a minimum reliability are ignored in BDC configurations. For example, the server may disable or recommend no crowdsourcing for a mobile device location if in "arm swinging" context. In some embodiments, in response to disabling collection for a particular context, the server may, for the remaining contexts, determine the list of beacons most relevant to the mobile device's geographical area and add the beacons to the BDC configuration.

In some embodiments, the mobile device may update BDC configuration independently of the server. In other words, in some embodiments the mobile device may perform some or all of the server-implemented processes described above.

In some embodiments, a server receives and processes beacon data to create Location Data that includes Location Context Identifiers or other data related to a physical location or environment. For example, Location Data can include: a map of the location (for example, including building or floor layout and points of interest), number of known access points, BT transmitters, historical data traffic, device activity associated with the position or location, location of APs, location of BT transmitters, or other location features.

Location Data may be subdivided into multiple sub-locations such that a user or device can download or access the section of Location Data relevant to a current location. As the user or device moves from one location to another, the Location Data related to the current location may be accessed locally at a mobile device or downloaded as needed from a server. In other embodiments, the server may automatically determine related/relevant Location Data that a device may find relevant based on direction of movement or position of the device or the current location of the mobile device.

In one embodiment, the Location Data stored at the server (for example, within the location database) may be determined by a baseline data collection sequence from one or more mobile devices or a pre-seeded database. During one or more initial position data collection sessions by one or more mobile devices, BDC at the server may obtain or create additional Location Data. Subsequent mobile device data collection received by the server can be used to maintain and keep the location database up to date. For example, upon detecting a mobile device within a respective location, the server may compare incoming data collection at that location to current Location Data on the server. If the Location Data received by the server is more up to date or adds additional Location Data, the location database at the server may be updated. The updated Location data can distributed to subsequent mobile devices.

In some embodiments, the BDC configuration is adjusted according to the available features of the device (for example, whether the device has Bluetooth, accelerometer, WiFi, or other capability used to determine position or context for the device environment). For example, one device may have Bluetooth and WiFi, while other devices may be lacking Bluetooth but have multiple cameras or a magnetometer. Depending on individual device capability, different recommended BDC configurations can be sent from the server to the device. For example, a BT and GNSS enabled device may be able to provide detailed BT positioning information to a server. In another example, a device having WiFi and visible light communication features, but no GNSS, the configuration may request using visible light communication when available for a high confidence position fix.

In alternate embodiments, the mobile device or server may adjust the intensity or frequency of data collection for existing sensors based on a change in historical levels of RSSI and RTT. For example, an access point may fail or be removed from a location, resulting in different RSSI and RTT values from previous data collection sessions. The mobile device or server may recommend additional data collection from devices based on the change in recorded RSSI and RTT. For example, additional data collection may include additional sensors or increased robustness for existing sensors.

In one embodiment, devices connected to the server can self configure with an updated BDC configuration. Devices may use some or none of the recommended BDC configurations from the server when implementing data collection.

Figure 4:
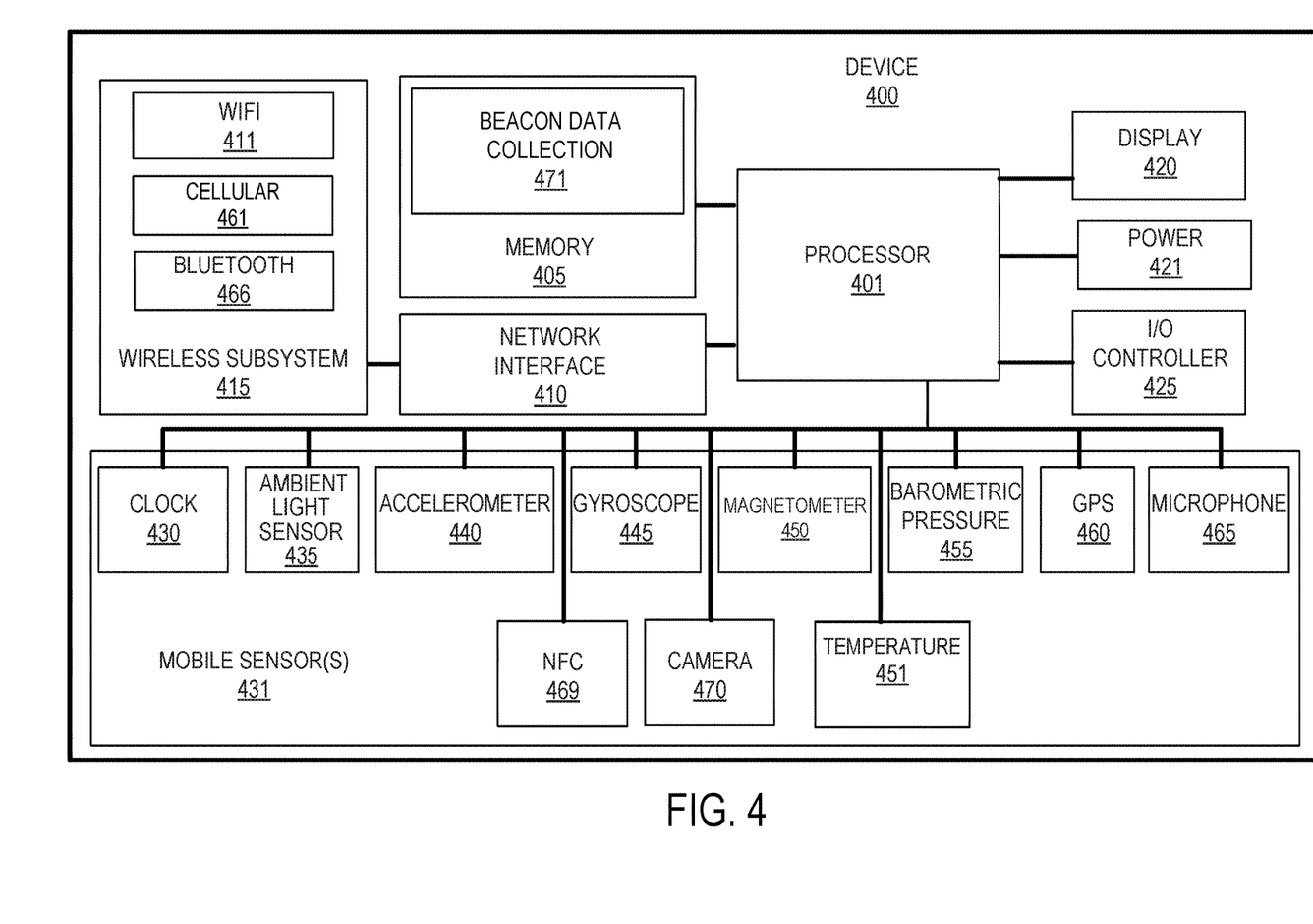
FIG. 4 is block diagram illustrating an exemplary device in which embodiments of BDC may be practiced.

FIG. 4 is block diagram illustrating an exemplary device in which embodiments of BDC may be practiced. BDC may be implemented as software, firmware, hardware, module, or engine. In one embodiment, the previous BDC, for example in accordance with a BDC configuration, description may be implemented by one or more general purpose processors (for example, processor 401) in device 400, for example coupled with memory 405, to achieve the previously desired functions (for example, the methods of FIG. 2A, FIG. 2B, and FIG. 3).

Device 400 may be a mobile device (for example, the mobile devices illustrated in FIG. 1), or a server, and may include one or more processors 401, a memory 405, I/O controller 425, and network interface 410. Device 400 may also include a number of device sensors coupled to one or more buses or signal lines further coupled to the processor 401. It should be appreciated that device 400 may also include a display 420, a user interface (for example, keyboard, touch-screen, or similar devices), a power device 421 (for example, a battery), as well as other components typically associated with electronic devices. In some embodiments, device 400 may be server that does not contain one or more example sensors (for example, motion sensors).

Device 400 can include sensors such as a clock 430, ambient light sensor (ALS) 435, accelerometer 440, gyroscope 445, magnetometer 450, temperature sensor 451, barometric pressure sensor 455, compass, proximity sensor, near field communication (NFC) 469, and/or Global Positioning Sensor (GPS or GNSS) 460. As used herein the microphone 465, camera 470, and/or the wireless subsystem 415 (Bluetooth 466, WiFi 411, cellular 461) are also considered sensors that may be used to analyze the environment (for example, position) of the device.

Memory 405 may be coupled to processor 401 to store instructions for execution by processor 401. In some embodiments, memory 405 is non-transitory. Memory 405 may also store one or more engines or modules to implement embodiments described herein. In some embodiments, processor 401 and memory 405 together are configured to obtain user context from positioning data of a mobile device, determine, in response to the obtained user context, a beacon data collection configuration, and collect the beacon data according to the beacon data collection configuration, as described above with reference to FIG. 2A. Processor 401 and memory 405 together may be configured to perform any other functions or methods described herein, including, for example, FIGS. 2B and 3. Memory 405 may also store data from integrated or external sensors. In addition, memory 405 may store application program interfaces (APIs) for accessing aspects of BDC as described herein. In some embodiments, BDC functionality is implemented in memory 405. In other embodiments, BDC functionality is implemented as a module separate from other elements in the device 400. The BDC module may be wholly or partially implemented by other elements illustrated in FIG. 4, for example in the processor 401 and/or memory 405, or in one or more other elements of device 400.

Network interface 410 may also be coupled to a number of wireless subsystems 415 (for example, Bluetooth 466, WiFi 411, Cellular 461, or other networks) to transmit and receive data streams through a wireless link to/from a wireless network, or may be a wired interface for direct connection to networks (for example, the Internet, Ethernet, or other wireless systems). Device 400 may include one or more local area network transceivers connected to one or more antennas. The local area network transceiver may include suitable devices, hardware, and/or software for communicating with and/or detecting signals to/from WAPs, and/or directly with other wireless devices within a network. In one aspect, the local area network transceiver may include a WiFi (802.11x) communication system suitable for communicating with one or more APs.

Device 400 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a code division multiple access (CDMA) communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or Global System for Mobile Communications (GSM). Additionally, any other type of wireless networking technologies may be used, for example, WiMax (802.16), Ultra Wide Band, ZigBee, wireless USB, etc. In conventional digital cellular networks, position capability can be provided by various time and/or phase measurement techniques. For example, in CDMA networks, one position determination approach used is Advanced Forward Link Trilateration (AFLT). Using AFLT, a server may compute its position from phase measurements of pilot signals transmitted from a plurality of base stations. Thus, device 400 may be a: wireless device, cell phone, personal digital assistant, mobile computer, wearable device (for example, head mounted display, watch, glasses, etc.), robot navigation system, tablet, personal computer, server, laptop computer, or any type of device that has processing capabilities.

In one embodiment, device 400 is a mobile device to obtain user context from positioning data of the mobile device. The mobile device determines, based on the obtained user context, a beacon data collection configuration and collects the beacon data according to the beacon data collection configuration.

In one embodiment, device 400 is a server to obtain user context from positioning data from a mobile device. The server determines, based on the obtained user context (for example, context determined by the mobile device), a beacon data collection configuration, and the server collects the beacon data from the mobile device according to the beacon data collection configuration performed by the mobile device.

As used herein, a mobile device may be any portable, or movable device or machine that is configurable to acquire wireless signals transmitted from one or more wireless communication devices or networks. Thus, by way of example but not limitation, device 400 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at device 400. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network.

A mobile device may communicate wirelessly with a plurality of APs using RF signals (for example, 2.4 GHz, 3.6 GHz, and 4.9/5.0 GHz bands) and standardized protocols for the modulation of the RF signals and the exchanging of information packets (for example, Institute of Electrical and Electronics Engineers (IEEE) 802.11x). By extracting different types of information from the exchanged signals, and utilizing the layout of the network (i.e., the network geometry) the mobile device may determine position within a predefined reference coordinate system.

In one embodiment, device 400 provides, at least in part, means for obtaining user context from a mobile device's positioning data; means for determining, based on the obtained user context, a beacon data collection configuration; and means for collecting the beacon data according to the beacon data collection configuration. For example, means for user context can be determined from the mobile sensors 431 and sensor measurements along with programs/algorithms to categorize the context as one or another of swinging arm, in pocket, etc. as described above. Obtaining the user context may include accessing memory 405 of the device when a mobile device performs the obtaining. When a server performs the obtaining, the device 400 is a server utilizing networking capabilities provided by network interface 410 to receive the user context from a mobile device. Means for collecting the beacon data can include beacon data collection module 471 which can collect beacon data with wireless subsystem 415.

Device 400 may also be a server providing means for receiving (for example, via network interface 410) the beacon data and the user context, and means for processing (for example, implemented by processor 401) the collected beacon data based on one or both of the user context and a reliability metric.

Device 400 may also provide means for determining a reliability metric based, at least in part, on the user context, where the beacon data collection configuration is based on the reliability metric and where the reliability metric is further based on one or more of: beacon data, positioning data consistency, or a combination thereof. Beacon data collection configuration may be determined according to both the user context and a reliability metric and one or both of the determining the beacon data collection configuration or the collecting the beacon data may performed by the mobile device.

It should be appreciated that embodiments described herein may be implemented through the execution of instructions, for example as stored in the memory 405 or other element, by processor 401 of device and/or other circuitry of device and/or other devices. Particularly, circuitry of device, including but not limited to processor 401, may operate under the control of a program, routine, or the execution of instructions to execute methods or processes in accordance embodiments described herein. For example, such a program may be implemented in firmware or software (e.g. stored in memory 405 and/or other locations) and may be implemented by one or more processors, such as processor 401, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device 400 itself and/or some or all of the functions, engines or modules described herein may be performed by another system connected through I/O controller 425 or network interface 410 (wirelessly or wired) to device. Thus, some and/or all of the functions may be performed by another system and the results or intermediate calculations may be transferred back to device. In some embodiments, such other device may comprise a server configured to process information in real time or near real time. In some embodiments, the other device is configured to predetermine the results, for example based on a known configuration of the device. Further, one or more of the elements illustrated in FIG. 4 may be omitted from the device 400. For example, one or more of the sensors 431 may be omitted in some embodiments.

The teachings herein may be incorporated into (for example, implemented within or performed by) a variety of apparatuses (for example, devices). For example, one or more aspects taught herein may be incorporated into a phone (for example, a cellular phone), a personal data assistant, a tablet, a mobile computer, a laptop computer, a tablet, an entertainment device (for example, a music or video device), a wearable device (for example, watch, headphones, eyewear, an earpiece, etc.), a user I/O device, a computer, a server, or any other suitable device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electronically Programmable Read Only Memory (EPROM), Electronically Erasable Programmable Read Only Memory (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (for example, hardware 162), software (for example, software 165), firmware (for example, firmware 163), or any combination thereof. If implemented in software as a computer program product, the functions or modules may be stored on or transmitted over as one or more instructions or code on a non-transitory computer-readable (i.e., machine-readable) medium. The machine-readable non-transitory storage medium can have, in some embodiments, stored therein program instructions that are executable by a processor to obtain user context from positioning data of a mobile device; determine, in response to the obtained user context, a beacon data collection configuration; and collect the beacon data according to the beacon data collection configuration. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for beacon data collection, the method comprising:
   obtaining user context from positioning data of a mobile device;
   based on a reliability metric associated with the obtained user context, determining a beacon data collection configuration; and
   collecting the beacon data according to the beacon data collection configuration,
   wherein the reliability metric indicates a reliability of one or more of: the positioning data, the collected beacon data, or a combination thereof, and
   wherein the collected beacon data is based on signals that are received by the mobile device from a beacon while the mobile device is in motion relative to the beacon, and
   wherein the user context comprises:
   a motion state of the mobile device,
   a location of the mobile device relative to a user possessing the mobile device,
   an activity of the user possessing the mobile device, or any combination thereof.

2. The method of claim 1, wherein the mobile device performs one or both of:
   the determining the beacon data collection configuration, or
   the collecting the beacon data.

3. The method of claim 1, further comprising:
   receiving, at a server, the beacon data and the user context, and
   processing, at the server, the collected beacon data according to one or both of the user context or the reliability metric.

4. The method of claim 1, wherein obtaining the user context from the positioning data of the mobile device comprises obtaining a user context indicative of one of:
   the mobile device is being held by or is attached to a swinging arm,
   the mobile device is in a vehicle,
   the mobile device is in a backpack, or
   the mobile device is in a pocket.

5. The method of claim 1, wherein the user context comprises one or more of:
   a location of the mobile device relative to a user possessing the mobile device,
   an activity of the user possessing the mobile device, or any combination thereof.

6. The method of claim 1, wherein the beacon data collection configuration includes one or more of:
   a weight for each of a plurality of different user contexts,
   a weight for each of a plurality of different types of beacon data,
   a weight for each of a plurality of different types of positioning data,
   or any combination thereof.

7. A mobile device to perform beacon data collection, the device comprising:
   memory; and
   a processor coupled to the memory, the processor and memory together configured to:

obtain user context from positioning data of the mobile device;
based on a reliability metric associated with the obtained user context, determine a beacon data collection configuration; and
collect the beacon data according to the beacon data collection configuration, based on signals that are received by the mobile device from a beacon while the mobile device is in motion relative to the beacon,
wherein the reliability metric indicates a reliability of one or more of: the positioning data, the collected beacon data, or a combination thereof, and
wherein the user context comprises:
a motion state of the mobile device,
a location of the mobile device relative to a user possessing the mobile device,
an activity of the user possessing the mobile device, or any combination thereof.

8. The device of claim 7, wherein the device configured to obtain the user context from the positioning data of the mobile device is configured to obtain a user context indicative of one of:
the mobile device is being held by or is attached to a swinging arm,
the mobile device is in a vehicle,
the mobile device is in a backpack, or
the mobile device is in a pocket.

9. The device of claim 7, wherein the user context comprises one or more of:
a location of the mobile device relative to a user possessing the mobile device,
an activity of the user possessing the mobile device, or any combination thereof.

10. The device of claim 7, wherein the beacon data collection configuration includes one or more of:
a weight for each of a plurality of different user contexts,
a weight for each of a plurality of different types of beacon data,
a weight for each of a plurality of different types of positioning data,
or any combination thereof.

11. A machine-readable non-transitory storage medium having stored therein program instructions that are executable by a processor to:
obtain user context from positioning data of a mobile device;
based on a reliability metric associated with the obtained user context, determine a beacon data collection configuration; and
collect the beacon data according to the beacon data collection configuration, based on signals that are received by the mobile device from a beacon while the mobile device is in motion relative to the beacon,
wherein the reliability metric indicates a reliability of one or more of: the positioning data, the collected beacon data, or a combination thereof, and
wherein the user context comprises:
a motion state of the mobile device,
a location of the mobile device relative to a user possessing the mobile device,
an activity of the user possessing the mobile device, or any combination thereof.

12. The medium of claim 11, wherein obtaining the user context from the positioning data of the mobile device comprises obtaining a user context indicative of one of:
the mobile device is being held by or is attached to a swinging arm,
the mobile device is in a vehicle,
the mobile device is in a backpack, or
the mobile device is in a pocket.

13. The medium of claim 11, wherein the user context comprises one or more of:
a location of the mobile device relative to a user possessing the mobile device,
an activity of the user possessing the mobile device, or any combination thereof.

14. An apparatus for beacon data collection, the apparatus comprising:
means for obtaining user context from positioning data of a mobile device;
means for determining, based on a reliability metric associated with the obtained user context, a beacon data collection configuration; and
means for collecting the beacon data according to the beacon data collection configuration,
wherein the collected beacon data is based on signals that are received by the mobile device from a beacon while the mobile device is in motion relative to the beacon, and
wherein the reliability metric indicates a reliability of one or more of: the positioning data, the collected beacon data, or a combination thereof, and
wherein the user context comprises:
a motion state of the mobile device,
a location of the mobile device relative to a user possessing the mobile device,
an activity of the user possessing the mobile device, or any combination thereof.

15. The apparatus of claim 14, wherein one or both of the determining the beacon data collection configuration or the collecting the beacon data is performed by the mobile device.

16. The apparatus of claim 14, further comprising means for receiving the beacon data and the user context at a server, and means for processing the collected beacon data based on one or both of the user context and the reliability metric.

17. The medium of claim 11, wherein the beacon data collection configuration includes one or more of:
a weight for each of a plurality of different user contexts,
a weight for each of a plurality of different types of beacon data,
a weight for each of a plurality of different types of positioning data,
or any combination thereof.

18. The apparatus of claim 14, wherein the user context comprises one or more of:
a location of the mobile device relative to a user possessing the mobile device,
an activity of the user possessing the mobile device, or any combination thereof.

19. The apparatus of claim 14, wherein obtaining the user context from the positioning data of the mobile device comprises obtaining a user context indicative of one of:
the mobile device is being held by or is attached to a swinging arm,
the mobile device is in a vehicle,
the mobile device is in a backpack, or
the mobile device is in a pocket.

20. The apparatus of claim 14, wherein the beacon data collection configuration includes one or more of:
a weight for each of a plurality of different user contexts,
a weight for each of a plurality of different types of beacon data, a weight for each of a plurality of different types of positioning data,
or any combination thereof.

\* \* \* \* \*